United States Patent
Yang

(10) Patent No.: US 11,486,387 B2
(45) Date of Patent: Nov. 1, 2022

(54) FLAP VALVE WITH IMPROVED RETAINER

(71) Applicant: ScopeNEXT Ltd., Worcester (GB)

(72) Inventor: Michael Yang, Worcester (GB)

(*) Notice: Subject to any disclaimer, the term of this patent is extended or adjusted under 35 U.S.C. 154(b) by 0 days.

(21) Appl. No.: 15/931,920

(22) Filed: May 14, 2020

(65) Prior Publication Data
US 2020/0362852 A1 Nov. 19, 2020

(30) Foreign Application Priority Data

May 14, 2019 (GB) ...................................... 1906808

(51) Int. Cl.
*F16K 15/03* (2006.01)
*F04B 53/10* (2006.01)

(52) U.S. Cl.
CPC ........ *F04B 53/1042* (2013.01); *F16K 15/031* (2013.01); *F16K 2200/50* (2021.08); *Y10T 137/6086* (2015.04); *Y10T 137/7504* (2015.04)

(58) Field of Classification Search
CPC .... F16K 15/03; F16K 15/031; F16K 27/0227; F16K 27/0209; F16K 2200/50; Y10T 137/6086; Y10T 137/7504
See application file for complete search history.

(56) References Cited

U.S. PATENT DOCUMENTS

| | | | | |
|---|---|---|---|---|
| 2,664,264 A | * | 12/1953 | Fennema | F16K 15/03 137/454.5 |
| 4,063,570 A | * | 12/1977 | Mitchell | F16K 15/031 137/454.2 |
| 5,236,007 A | * | 8/1993 | Scaramucci | F16K 15/03 137/454.2 |
| 5,622,484 A | | 4/1997 | Taylor-McCune et al. | |

(Continued)

FOREIGN PATENT DOCUMENTS

| | | |
|---|---|---|
| EP | 1474281 | 11/2004 |
| GB | 2366852 | 3/2002 |

(Continued)

OTHER PUBLICATIONS

Intellectual Property Office, "Combined Search and Examination Report under Sections 17 and 18(3)," App. No. GB1906808.9 (dated Nov. 14, 2019).

(Continued)

*Primary Examiner* — Kevin F Murphy
(74) *Attorney, Agent, or Firm* — Walters & Wasylyna LLC

(57) ABSTRACT

A one-piece flap valve (150) comprising first and second portions hingedly connected to one another by a flexible strip, the first portion having a hingeable internal valve flap (152) and the second portion comprising an at least partially annular valve seat (154). The first and second portions being socket-fitted together by relative movement, such that the valve seat (54, 154) is spanned by the flap (152), the second portion comprising first and second legs (121*a*, 121*b*) having first and second locking lugs (127*a*, 127*b*) extending radially outwardly therefrom, the locking lugs for location within locking apertures (125*a*, 125*b*) of a tube body (10) of a dispenser. The flap valve (150) comprising a retaining mechanism configured and arranged such that once the flap valve is installed in a tube body of a dispenser, the retaining mechanism resists against radially inward displacement of the first and second legs.

20 Claims, 4 Drawing Sheets

(56) References Cited

U.S. PATENT DOCUMENTS

| | | | |
|---|---|---|---|
| 8,230,875 B2 * | 7/2012 | Norman | F16K 27/0209 |
| | | | 137/315.33 |
| 8,408,244 B2 * | 4/2013 | Gilcher | E03C 1/104 |
| | | | 137/511 |
| 8,636,026 B2 | 1/2014 | Kelly et al. | |
| 2002/0070238 A1 | 6/2002 | Pritchett et al. | |

FOREIGN PATENT DOCUMENTS

| | | |
|---|---|---|
| GB | 2 366 852 B | 9/2004 |
| WO | WO 2006/047838 | 5/2006 |

OTHER PUBLICATIONS

European Patent Office, Extended European Search Report, App. No. 20174846.4 (dated Nov. 13, 2020).

* cited by examiner

FLAP VALVE WITH IMPROVED RETAINER

PRIORITY

This application claims priority from GB 1906808.9 filed on May 14, 2019, the entire contents of which are incorporated herein by reference.

FIELD

The present invention relates to an improved flap valve and more particularly, but not exclusively, to a flap valve comprising a retaining mechanism for ensuring secure location and retention of the improved flap valve within a pump body. More particularly, but not exclusively, this invention relates to a flap valve made by injection molding a plastics material and having a retaining mechanism.

Aspects of the invention relate to a flap valve having an integral, improved retainer and to a pump dispenser comprising the same.

BACKGROUND

In the field of pump dispensers for use in various industries, it is known to use valves, such as flap-valves for controlling the dispensing of product. In a flap valve with an internal valve seat it is usual for the bore of the valve to widen under the valve seat. It is also well known that an item to be injection molded cannot have any re-entrant areas, and, until EP1474281 to the present applicant, it was not thought possible to make such a flap valve in a single injection molding operation. It was thought necessary to make the valve in at least two parts in separate molds, or separate mold cavities. However, with EP '281, a new flap valve was introduced with an internal valve seat that could be manufactured in one piece in a single mold cavity, thereby significantly reducing manufacturing costs. An example of a production model of the flap valve disclosed in EP '281 is shown in FIGS. 1, 2A, 3A and 4A of the accompanying drawings.

In many applications, the EP '281 flap valve operates very well and is a commercially successful product for the applicant. In a very limited number of cases, a flap valve has inadvertently been dislodged from its fitment within a body tube 10 (as shown in FIG. 1) of a pump dispenser 100 (as shown in FIG. 1).

It is an object of the present invention to provide an improved flap-valve, that mitigates against or completely prevents, inadvertent dislodgement from the pump dispenser.

The invention finds advantageous application for use in large volume pump dispensers for use with larger containers and drums having, for example, a volume in the range of about 20 liters to 200 liters. Such large-volume dispensers may be capable of dispensing up to about 400 ml per pump stroke. Such dispensers may have a wide variety of industrial and commercial applications, including for example, in the Janitorial, Agrochemical, Healthcare, Foods, and Farming fields, and the like. Products that may be dispensed by such pump dispensers include, various pH cleaning chemicals, chlorine-based products, oils and fertilizers, and crop chemicals.

SUMMARY

According to one aspect of the invention, there is provided a one-piece flap valve comprising first and second portions hingedly connected to one another by a flexible strip, the first portion having a hingeable internal valve flap comprising a circumferential wall, which is spaced from and surrounds the internal-valve flap; and the second portion comprising an at least partially annular valve seat, the first and second portions being socket-fitted together with the valve seat spanned by the flap, the second portion comprising first and second legs having first and second locking lugs extending radially outwardly therefrom, the locking lugs for location within locking apertures of a tube body of a dispenser, and the flap valve comprising a retaining mechanism, the retaining mechanism comprising at least one prong extending from and extending beyond the circumferential wall, such that once the flap valve is installed in a tube body of a dispenser, the retaining mechanism resists against radially inward displacement of the first and second legs.

Optionally, the at least one prong may have a curved shape.

Optionally, the retaining mechanism comprises four prongs extending from and extending beyond (i.e. above) the circumferential wall. Each prong may be separated from its adjacent neighboring prong by a recess.

Optionally, a first prong is disposed radially inward of the first leg; and wherein a second prong is disposed radially inward of the second leg.

Optionally, first and second rebated sections are provided on the second portion to receive first and second wall sections that are provided on the outside of the circumferential wall.

Optionally, the flap is hingeably connected to the first wall section of the first portion by a stem of reduced thickness extending radially of the flap, the flap being otherwise unconnected to the first portion.

Optionally, a length of the said flexible strip is just sufficient to allow relative rotation of the first and second portions until the flap spans the aperture in the valve seat.

According to another aspect of the invention, there is provided a pump dispenser comprising at least one, one-piece flap valve according to any of the relevant preceding paragraphs. Optionally, said pump dispenser may be attached to a container.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

DETAILED DESCRIPTION

Detailed descriptions of specific embodiments of the flap valves and dispensing pumps of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the flap valves and dispensing pumps described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
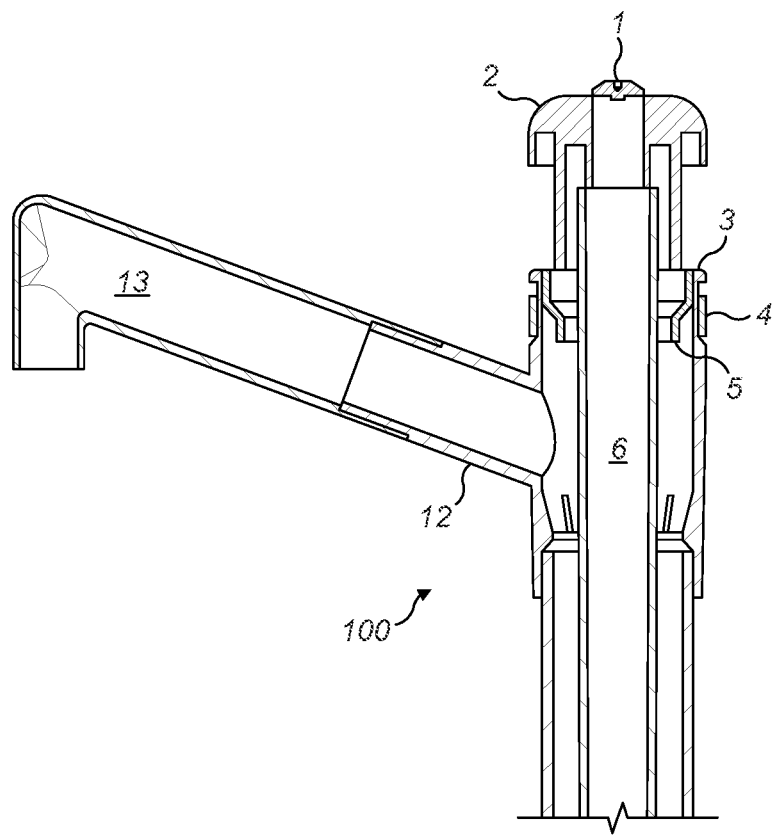
FIG. 1 is a cross-sectional view through a known pump dispenser comprising two flap valves according to the prior art, the first a plunger flap valve; and the second, a foot flap valve.
Figure 1:
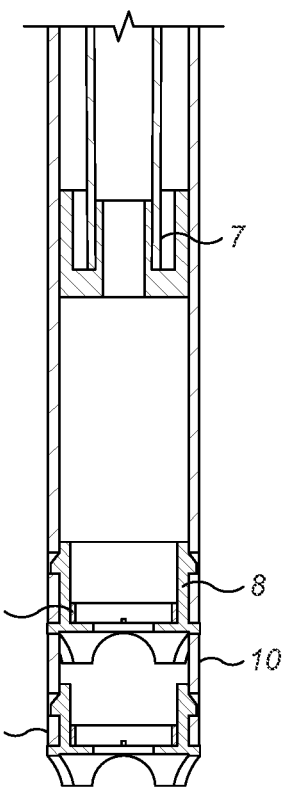
Figure 2A:
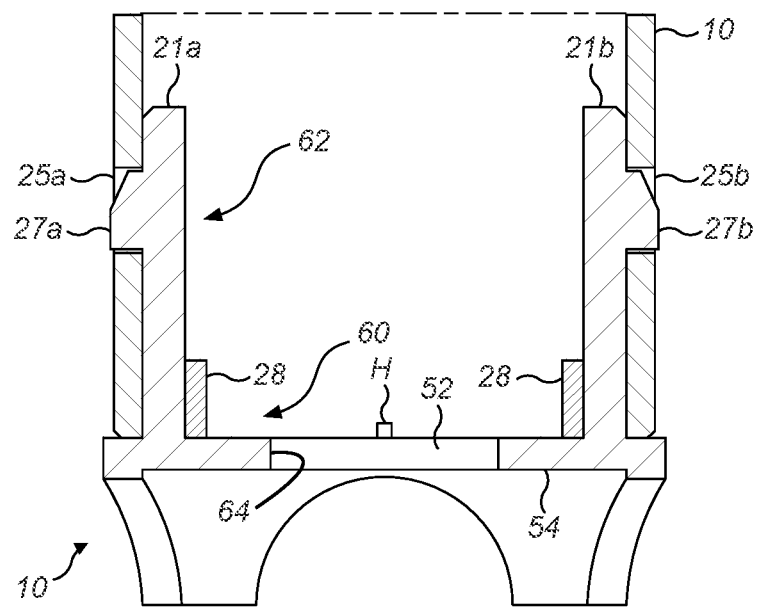
FIG. 2A is a cross-sectional view of a known flap valve according to the prior art in an assembled and closed condition, wherein a first (top) portion having a hingable internal flap is socketed within a second (bottom) portion having a valve seat and an aperture the flap valve is located over the aperture and spans the valve seat.
Figure 2B:
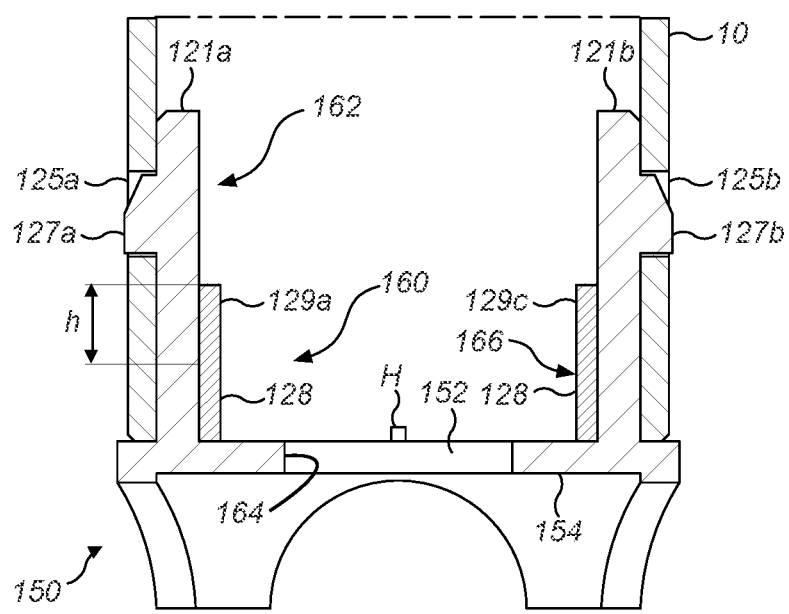
FIG. 2B is a cross-sectional view of a flap valve according to embodiments of the invention, in an assembled and closed condition, where, in a similar manner to the flap valve of FIG. 2A, a first (top) portion having a hingable internal flap is socketed within a second (bottom) portion having a valve seat and an aperture, and the flap valve is located over the aperture and spans the valve seat.
Figure 3A:
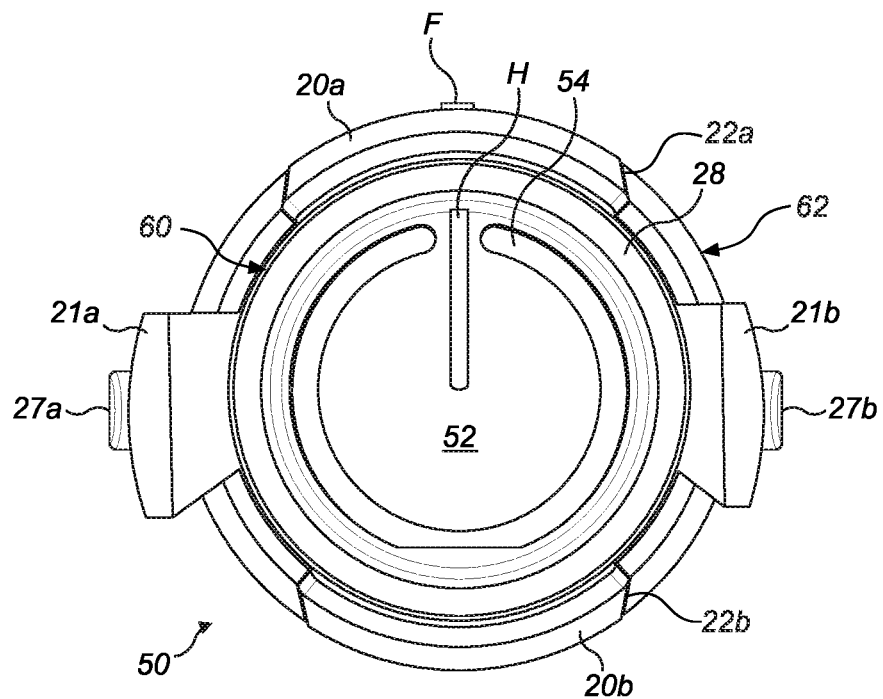
FIGS. 3A and 4A are perspective views from above of the known flap valve of FIG. 2A.
Figure 3B:
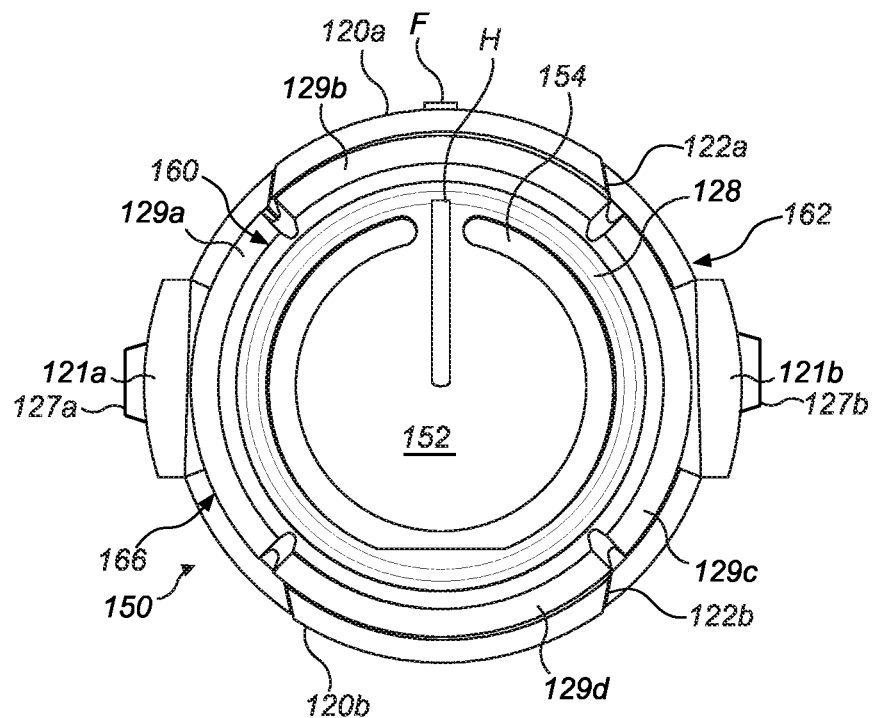
FIGS. 3B and 4B are perspective views from above of the new flap valve according to various embodiments and as shown in FIG. 2B.
Figure 4A:
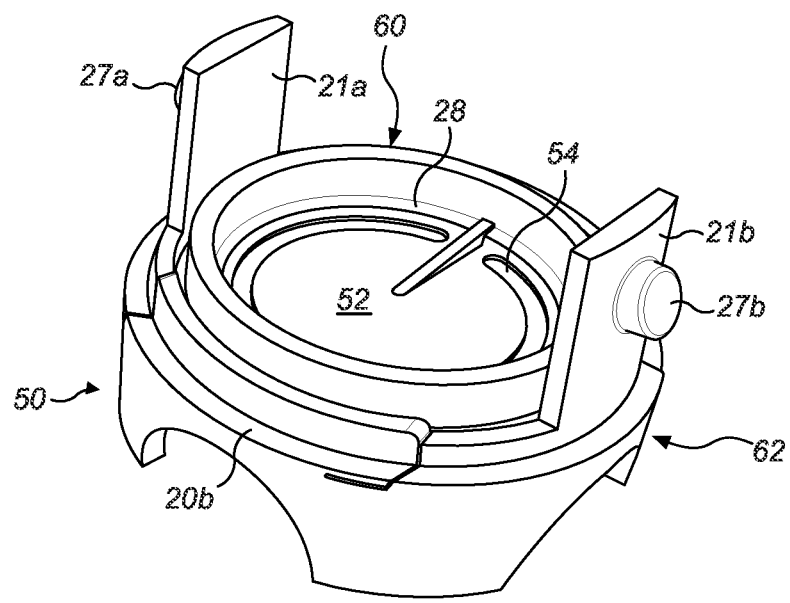
Figure 4B:
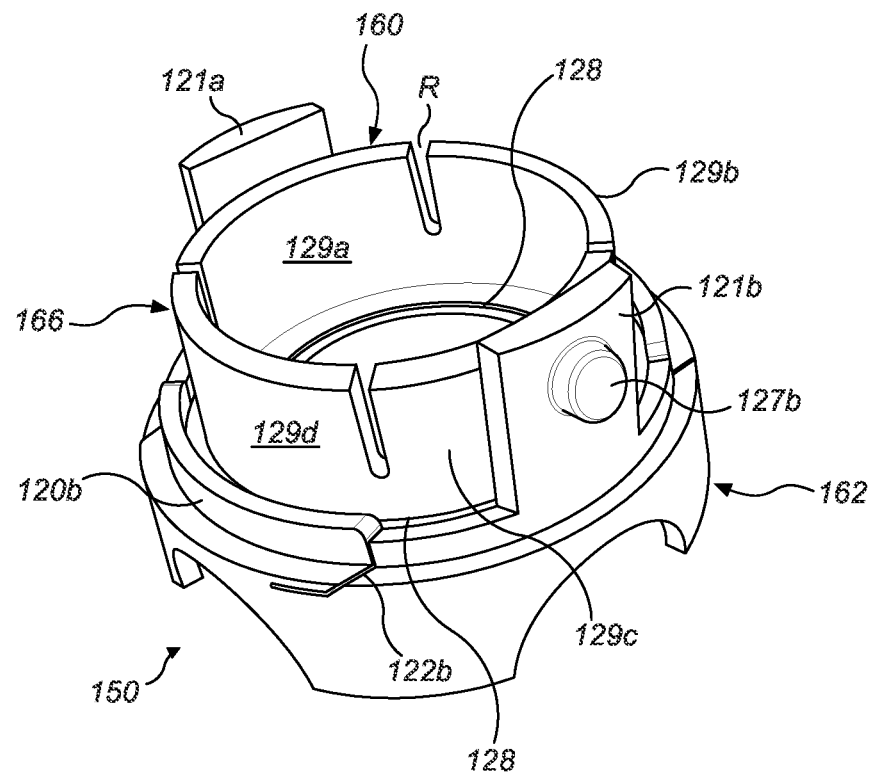

The flap-valve 150, according to various embodiments of the invention, is illustrated in FIGS. 2B, 3B and 4B. In FIG. 2B the flap-valve 150 is shown in an installed position within a body-tube 10 of a pump dispenser (e.g., as shown in FIG. 1). To aid in description of the flap-valve 150 of the present disclosure, first, the known flap valve 50, shown in FIGS. 1, 2A, 3A, and 4A will be described.

The known flap valve 50 has a first (top or upper) portion 60 hinged, by a flexible strip F to a second bottom or lower) portion 62. The provision of the flexible hinging strip F enables the first and second portions 60, 62 to be injection molded from a plastics material in a single mold cavity.

The first (top or upper) portion 60 comprises a main circumferential wall 28, which is spaced from and surrounds a flap 52. First and second wall sections 20a, 20b are disposed on the outside of the circumferential wall 28 and are disposed on opposite sides thereof. This is perhaps best illustrated in FIG. 3A. The substantially circular, planar flap 52 is hingeably connected to an internal part of the main circumferential wall 28 by a narrow stem H. The first and second wall sections 20a, 20b are sized, shaped, arranged, or otherwise configured to mate with corresponding rebated regions 22a, 22b of the second bottom portion 62 of the flap-valve 50. The corresponding rebated regions 22a, 22b, of the second bottom portion 62 allow for a friction-fit, snap-fit or socket style connection between the first portion 60 and the second portion 62 to form the completed flap-valve unit 50.

The second (bottom or lower) portion 62 comprises an aperture 64, a partially annular valve seat 54, and the first and second rebated regions 22a, 22b on either side of the partially annular valve seat 54, which are each abutted by a shoulder of the partially annular valve seat 54. Once the first and second portions 60, 62 are located together the first wall section 20a (closest to the strip hinge H) is seated and located within the first rebated region 22a; and the second wall section 20b is seated and located within the second rebated region 22b. Once the flap valve 50 is assembled, the flap 52 may come to rest on the partially annular valve seat 54.

Additionally, the second (bottom or lower) section portion 62 comprises a pair of diametrically opposed upstanding legs 21a, 21b, each having a lug 27a, 27b which can be located within an aperture 25a, 25b or detent provided within the tube body 10 of a pump dispenser body (e.g., as shown in FIG. 2A). The legs 21a, 21b upstand from an edge of the partially annular valve seat 54. The first (top or upper) portion 60 is received between these legs 21a, 21b in the assembled condition (see FIGS. 3A and 4A).

The plastics material from which the flap valve 50 is constructed is fairly rigid, but does have an inherent degree of flexibility. This, in conjunction with the structure of the flap valve 50, causes the legs 21a, 21b to have a small, limited, range of movement, radially outward and radially inward, either side of an at rest, normal position in which the legs 21a, 21b are upstanding from the second portion 62. This enables the flap valve 50 to be snugly inserted into a body tube 10 of a pump dispenser 100. During installation, the legs 21a, 21b are urged, forced or otherwise moved slightly radially inwardly. Then, upon reaching the location within the pump tube 10 at which the flap valve 50 is to be secured, the lugs 27a, 27b can be located within apertures 25a, 25b provided in the main body tube 10 (see FIG. 2A). As mentioned above, for a significant majority of applications, the flap valve 50 operates very well. However, in certain applications, inadvertent dislodgement of the flap valve 50 out of the tubular body 10 can occur.

In view of this, the present disclosure provides an improved flap valve 150, as shown in FIGS. 2B, 3B, and 4B. Again, the flap valve 150 is a hinged two-section construct with a first stop or upper) portion 160 being hinged to and friction-fitted into the second bottom or lower) portion 162. As before the second (bottom or lower) portion 162 comprises an aperture 164, a partially annular valve seat 154, and first and second rebated sections 122a, 122b on either side of the partially annular valve seat 154, which are each abutted by a shoulder of the partially annular valve seat 154. Additionally, the second (bottom or lower) portion 162 comprises a pair of diametrically opposed upstanding legs 121a, 121b, each having a lug 127a, 1271b, which can be located within an aperture 125a, 125b or detent provided within the tube body 10 of a pump dispenser body (e.g., as shown in FIG. 2B). The legs 121a, 121b again upstand from an edge of partially annular valve seat 154. The first (top or upper) portion 160 is received between these legs 121a, 121b in the assembled condition (see FIGS. 3B and 4B).

The flap valve 150 again has a flexible strip F to hinge the first stop or upper) portion 160 to the second bottom or lower) portion 162, which again enables the first and second portions 160, 162 to be injection molded from a plastics material in a single mold cavity.

The first (top or upper) portion 160 again comprises a main circumferential wall 128, which is spaced from yet, surrounds the flap 152. First and second wall sections 120a, 120b (e.g., as shown in FIGS. 3B and 4B) are again disposed on the outside of the circumferential wall 128 on opposite sides thereof. This is perhaps best illustrated in FIG. 4B. The substantially circular, planar flap 152 is hingeably connected to an internal part of the main circumferential wall 128 by a narrow stem H (e.g., as shown in FIG. 3B). The first and second wall sections 120a, 120b are sized, shaped, arranged, or otherwise configured to mate with corresponding rebated regions 122a, 122b of the second bottom or lower) portion 162 of the flap-valve 150. The corresponding rebated regions 122a, 122b of the second bottom or lower) portion 162 allow for a friction-fit, snap-fit or socket style connection between the first and second portions 160, 162 to form the completed flap-valve unit 150, with the first (top or upper) portion 160 fitting inside the second (bottom or lower) portion 162.

Additionally, in the present embodiment, the flap valve 150 is provided with a retaining mechanism 166 that facilitates the secure location of the lugs 127a, 127b within the locking apertures 125a, 125b of the main tube body 10 (e.g., as shown in FIG. 2B). Optionally, the retaining mechanism 166 is provided by a series, of prongs, optionally four prongs 129a, 129b, 129c, 129d, which each extend upwardly from the main circumferential wall 128. Optionally the additional height of the four prongs 129a, 129b, 129c, 129d above the main circumferential wall 128 is between about 5 mm and about 15 mm and may be about 10 mm in certain preferred arrangements, as indicated by 'h' in FIG. 2B. Each prong 129a, 129b, 129c, 129d is separated from its immediately adjacent and neighboring prongs 129a, 129b, 129c, 129d by a recess 'R' (see FIG. 4B). Accordingly, there are four recesses. In other arrangements there may be more or fewer than four prongs and 129a, 129b, 129c, 129d and a corresponding number of recesses 'R'.

Optionally, one or more or each recess 'R' may be slightly tapered. Any such tapered recess 'R' may be tapered such that the top of the recess is very slightly wider than the bottom of the recess 'R.' The recess 'R' may terminate on the main circumferential wall 128. The recess 'R' may terminate in a "U-shape".

Optionally, one or more or each prong 129a, 129b, 129c, 129d has a uniform thickness from where it meets the circumferential wall 128 to its upper outer edge. Optionally, one or more or each prong 129a, 129b, 129c, 129d has the same thickness as the circumferential wall 128.

Once the first and second portions 160, 162 are located together the first wall section 120a (closest to the flexible strip F) is seated and located within the first rebated region 122a; the second wall section 120b is seated and located within the second rebated region 122b; and the prongs 129a, 129c are disposed between the legs 121a, 121b. Once the flap valve 150 is assembled, the flap 152 may come to rest on the partially annular valve seat 154, proximate to the second wall section 120b and second rebated region 122b.

As previously described, the plastics material from which the flap valve 150 is constructed is fairly rigid, but has a sufficient inherent flexibility, such that, in conjunction with the structure of the flap valve 150, the legs 121a, 121b have a small, limited, range of movement, radially outward and radially inward. Due to the provision of the retaining mechanism 166, the range of movement of the legs 121a, 121b radially inwardly is limited. Additionally, and/or alternatively, to insert the flap valve 150 into a body tube 10 of a pump dispenser 100, the legs 121a, 121b are urged, forced or otherwise moved slightly radially inwardly (i.e., "squeezed-in"). Then, upon reaching the location within the pump at which the flap valve 150 is to be secured, the lugs 127a, 127b can be snap-fitted into their securing located within the apertures 125a, 125b provided in the main body tube 10 (see FIG. 2B). At this point the legs 121a, 121b are less able to "relax" radially inwardly due to the provision of the prongs 129a, 129b, 129c, 129d of the retaining mechanism. In many installations of the flap valve 150, a tension is established between the retaining mechanism 166 and legs 121a, 121b, with the prongs 129a, 129b, 129c, 129d of the retaining mechanism 166 imparting a radially outwardly directed force against the "squeezed-in" legs 121a, 121b thus urging the lugs 127a, 127b into their secure engaged location, and thus ensuring that no inadvertent removal of the flap valve 150 can occur.

To remove the flap valve 150 a deliberate, strong radially inward force acting simultaneously on each of the lugs 127a, 127b is required to push the lugs 127a, 127b clear of the apertures 125a, 125b. The deliberate and radially inward force needs to be sufficiently strong in order to squeeze both legs 121a, 121b radially inward and at the same time to additionally squeeze the prongs 129a, 129c inwardly. The force required to remove the flap valve 150 from a main body tube 10 of a pump dispenser is significantly greater than the force required to remove an equivalently sized and shaped flap valve 50 of the prior art. In this way the present disclosure provides an improved one-piece (unitary) flap valve 150 with a retaining mechanism to ensure a very secure fit, that can still be made using a plastics molding process.

An example of use of the flap valve 150 according to the present invention is to prevent reverse flow of a fluid being pumped out of a container (not shown). The second (bottom or lower) portion 162 of the flap valve 150 provides an outlet of the container; and the first (top or upper) portion 160 provides an inlet of the pump chamber. When suction is created in the pump chamber the flap 152 will lift off the seat 154 to permit fluid to flow from the container into the pump chamber. When thereafter fluid in the pump chamber is pressurized the flap 152 will be forced onto the seat 154 preventing reverse flow of the fluid.

It can be appreciated that various changes may be made within the scope of the present invention, for example, in other embodiments of the invention it is envisaged that the retaining mechanism may comprise a number of prongs other than four prongs. At least two prongs may be provided. The recess between two adjacent prongs may vary from that described and illustrated and, in some arrangements, may be much larger than the recesses R shown.

What is claimed is:

1. A flap valve comprising:
   a first portion comprising:
      a circumferential wall;
      an internal valve flap hingedly connected to the circumferential wall, wherein the circumferential wall is spaced from and surrounds the internal valve flap; and
      a retaining mechanism comprising a first prong extending upwardly from the circumferential wall and a second prong extending upwardly from the circumferential wall, opposite the first prong; and
   a second portion comprising:
      an at least partially annular valve seat;
      a first leg extending upwardly from the valve seat and comprising a first lug extending outwardly therefrom; and
      a second leg extending upwardly from the valve seat, opposite the first leg, and comprising a second lug extending outwardly therefrom, wherein:
the first portion and the second portion are connectable to configure the flap valve in an assembled condition in which at least a portion of the first portion is fit within at least a portion of the second portion;
in the assembled condition, the internal valve flap spans the valve seat; and
in the assembled condition, the circumferential wall and the retaining mechanism are located radially inward of the first leg and the second leg such that the first prong resists radially inward displacement of the first leg and the second prong resists radially inward displacement of the second leg.

2. The flap valve according to claim 1, wherein the at least one of the first prong and the second prong has a curved shape.

3. The flap valve according to claim 1, wherein:
the retaining mechanism further comprises a third prong; and
the first prong, the second prong, and the third prong extend from and about the circumferential wall.

4. The flap valve according to claim 3, wherein each one of the first prong, the second prong, and the third prong is separated from its adjacent neighboring prong by a recess.

5. The flap valve according to claim 3, wherein:
the retaining mechanism further comprises a fourth prong; and
the first prong, the second prong, the third prong, and the fourth prong extend from and about the circumferential wall.

6. The flap valve according to claim 5, wherein each one of the first prong, the second prong, and the third prong and the fourth prong is separated from its adjacent neighboring prong by a recess.

7. The flap valve according to claim 1, wherein the internal valve flap is hingeably connected to the circumferential wall of the first portion by a stem of reduced thickness extending radially of the internal valve flap, the flap being otherwise unconnected to the first portion.

8. A pump dispenser comprising the flap valve according to claim 1.

9. The pump dispenser according to claim 8 attached to a container.

10. The flap valve according to claim 1, wherein:
the flap valve is configured to be installed in a tube body of a pump dispenser;
with the flap valve installed in the tube body of the dispenser, the first lug and the second lug are configured to be located within locking apertures of the tube body of the pump dispenser; and
with the flap valve is installed in the tube body of the dispenser, the first prong and the second prong resist removal of the first lug and the second lug from within locking apertures of the tube body of the pump dispenser.

11. The flap valve according to claim 1, wherein, in the assembled condition, the first portion is secured to the second portion by a friction-fit connection.

12. The flap valve according to claim 1, wherein, in the assembled condition, the first portion is secured to the second portion by a snap-fit connection.

13. The flap valve according to claim 1, wherein, in the assembled condition, the first portion is secured to the second portion by a socket-fit connection.

14. A pump dispenser comprising:
a tube body, wherein the tube body comprises a first locking aperture and a second locking aperture, opposite the first locking aperture; and
a flap valve situated within the tube body and comprising
a first portion comprising:
a circumferential wall;
an internal valve flap hingedly connected to the circumferential wall, wherein the circumferential wall is spaced from and surrounds the internal valve flap; and
a retaining mechanism comprising a first prong extending upwardly from the circumferential wall and a second prong extending upwardly from the circumferential wall, opposite the first prong; and
a second portion comprising:
an at least partially annular valve seat;
a first leg extending upwardly from the valve seat and comprising a first lug extending outwardly therefrom; and
a second leg extending upwardly from the valve seat, opposite the first leg, and comprising a second lug extending outwardly therefrom,
wherein:
the first portion is rotatable relative to and the second portion are connectable to configure the flap valve in assembled condition in which at least a portion of the first portion is fit within at least a portion of the second portion for installation in the tube body;
in the assembled condition, the internal valve flap spans the valve seat; and
in the assembled condition, the circumferential wall and the retaining mechanism are located radially inward of the first leg and the second leg;
with the flap valve installed in the tube body of the dispenser, the first lug is located within the first locking aperture of the tube body and the second lug is located within the second locking aperture of the tube body; and
with the flap valve is installed in the tube body of the dispenser, the first prong resists radially inward displacement of the first leg and removal of the first lug from the first aperture and the second prong resists radially inward displacement of the second leg and removal of the second lug from the second locking aperture.

15. The pump dispenser according to claim 14, wherein the at least one of the first prong and the second prong has a curved shape.

16. The pump dispenser according to claim 14, wherein:
the retaining mechanism further comprises a third prong and a fourth prong; and
the first prong, the second prong, the third prong and the fourth prong extend from and about the circumferential wall.

17. The pump dispenser according to claim 14, wherein the internal valve flap is hingeably connected to the circumferential wall of the first portion by a stem of reduced thickness extending radially of the internal valve flap, the flap being otherwise unconnected to the first portion.

18. The pump dispenser according to claim 14, wherein, in the assembled condition, the first portion is secured to the second portion by a friction-fit connection.

19. The pump dispenser according to claim 14, wherein, in the assembled condition, the first portion is secured to the second portion by a snap-fit connection.

20. The pump dispenser according to claim 14, wherein, in the assembled condition, the first portion is secured to the second portion by a socket-fit connection.

\* \* \* \* \*